United States Patent

[11] 3,596,925

[72] Inventor  Glen W. Richie
            P. O. Box 26, Salem, Va. 24153
[21] Appl. No. 856,611
[22] Filed    Sept. 10, 1969
[45] Patented Aug. 3, 1971

[54] EASILY CONNECTABLE TRAILER COUPLING
    8 Claims, 4 Drawing Figs.

[52] U.S. Cl. .................................................. 280/477
[51] Int. Cl. ................................................. B62d 53/00
[50] Field of Search ........................................ 280/491.8,
                                                       477, 478

[56]            References Cited
                UNITED STATES PATENTS
1,924,235   8/1933   Fontaine ..................... 280/477
2,459,731   1/1949   Wymore ..................... 280/477 UX
2,481,898   9/1949   Bevan .......................... 298/17
2,736,575   2/1956   Gebhart ........................ 280/477
3,201,144   8/1965   Smyser ......................... 280/477

*Primary Examiner*—Leo Friaglia
*Attorney*—Mason, Fenwick & Lawrence

ABSTRACT: A trailer coupling of the ball and socket type in which a ball-type male trailer connector is attached to a towing vehicle with a pulley being connected coaxially with the male connector so that a cable loop from the trailer can be looped over the pulley and tightened by a winch on the trailer for positioning a female trailer connector portion on the forward end of the trailer adjacent the male connector upon tightening of the loop by the winch.

Patented Aug. 3, 1971
3,596,925
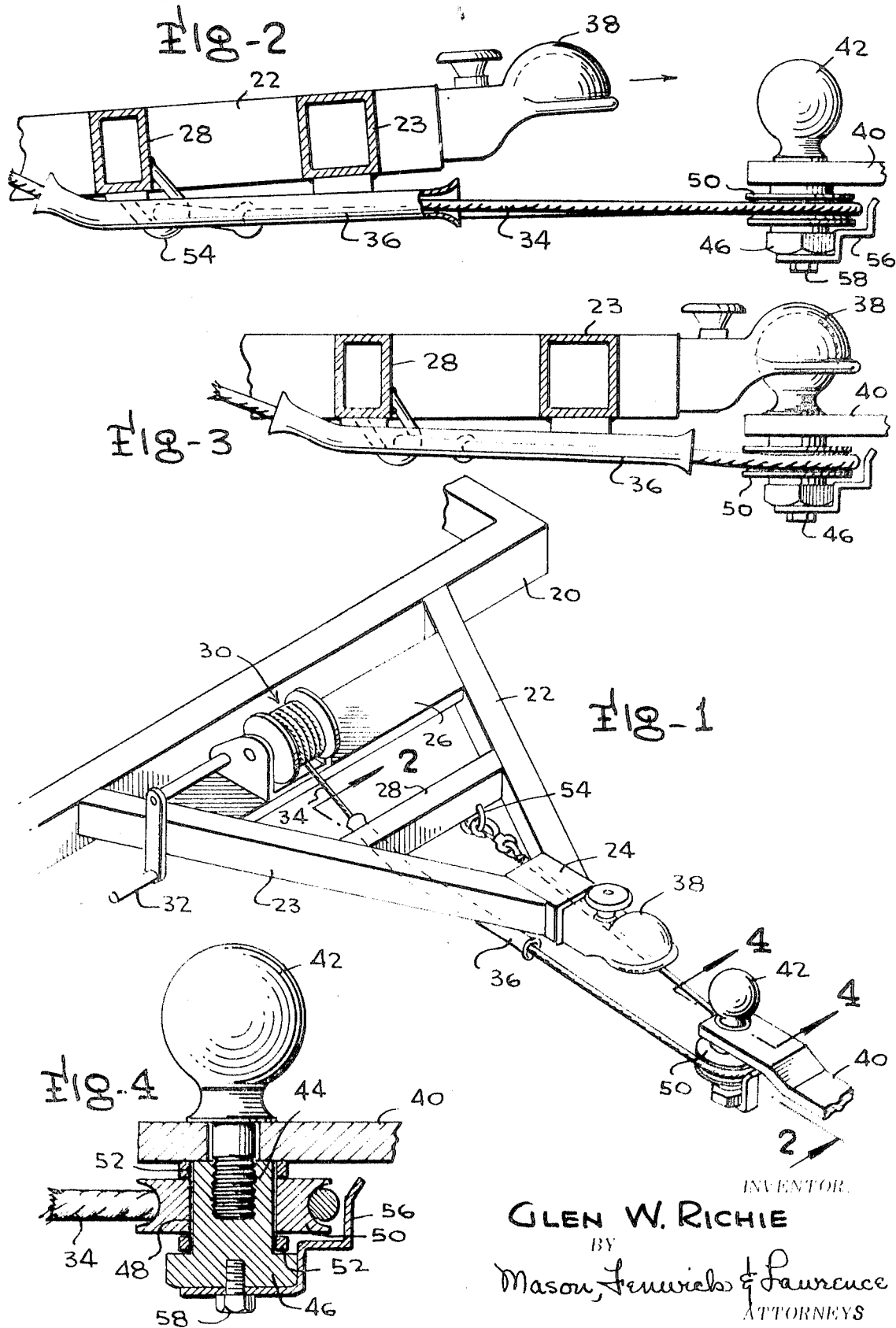
INVENTOR.
GLEN W. RICHIE
BY
Mason, Fenwick & Lawrence
ATTORNEYS

EASILY CONNECTABLE TRAILER COUPLING

BACKGROUND OF THE INVENTION

THis invention is directed to the field of connector members and is specifically directed to a trailer-coupling system by which the connection between the trailer and the towing vehicle is easily enabled. Even more specifically, the instant invention is directed to a ball-and-socket-type coupling system in which the male connector is in the form of a ball-coupling member extending rearwardly from a towing vehicle over which a female connector on the forward end of the trailer is attached for towing purposes.

Numerous prior art systems have been employed for connecting trailers to their towing vehicles. Many of the prior known systems require that the operator manually maneuver the trailer into a position in which the female connector is vertically aligned with the male ball-type connector for connection thereto. Such manual maneuvering requires a great deal of physical effort in the form of pushing, lifting, pulling and other physical exertion. Moreover, when a trailer is heavily loaded, it frequently occurs that it is practically impossible for a single person to connect the trailer to the towing vehicle. Not only has the problem of connecting trailers to the towing vehicle been difficult and annoying, it has also been extremely dangerous and results in many personal injuries each year such as fractures, hernias, sprains and the like.

The foregoing problems have long been recognized by those skilled in the art and numerous devices have been brought forward in an effort to correct and overcome these problems. For example, U.S. Pat. No. 2,736,575 discloses a system in which a cable is connectable to the top of a specially designed ball-type male connector on the towing vehicle so that actuation of a trailer-mounted winch will serve to position the female portion of the connector on the ball connector. However, the device shown in this patent requires a mechanically modified male connector different from conventional connectors and also requires that the winch on the trailer be capable of exerting substantial force since there is no mechanical advantage attained by the single-cable connection between the trailer and the male ball connector. Numerous other systems similar to the system shown in this patent have been employed; however, all of the previous known systems have required an expensive modification of the conventional trailer hitch equipment so that their adoption has been quite limited.

SUMMARY OF THE INVENTION

It is the primary object of this invention to provide a new and improved trailer hitch system which requires practically no modification of known existing systems and which enables an easy connection of the trailer to the towing vehicle.

Obtainment of the foregoing primary object of this invention is enabled through the provision of a rotary pulley member mounted for rotation on a bearing connected to the lower end of a conventional ball-type male coupling attached to the towing vehicle. The pulley and bearing means is connected to the ball-type coupling member in place of the normal retaining nut threadably received on the lower end of the coupling member. A cable loop from a winch on the trailer is easily attached over the pulley with one end of the loop being fixedly connected to the trailer and the other being connected to the winch so that the operation of the winch will result in movement of the forward end of the trailer and the female coupling attached thereto to a position adjacent the male coupling in order the the members may then be connected together. The employment of a pulley member enables the obtainment of a 2:1 mechanical advantage in the pulley member so that the winch on the trailer need be in only half the capacity of the winch employed with single-line connections as, for example, in the aforediscussed U.S. Pat. No. 2,736,575.

Since the instant invention merely necessitates replacement of the retaining nut on the lower end of the conventional ball-type connector member, there is absolutely no requirement that mechanical modification be made of any of the parts previously used and the subject invention can be attached and ready for use in a matter of seconds. Moreover, the simplicity of the invention results in a device that is economical both to manufacture and maintain.

DESCRIPTION OF THE DRAWINGS

FIG. 1 is a perspective view of the instant invention illustrating the respective parts on the trailer and towing vehicle with which such is employed;

FIG. 2 is a sectional view taken along lines 2–2 of FIG. 1 and illustrating the parts in an unhitched position;

FIG. 3 is a sectional view similar to FIG. 2 but illustrating the parts in their hitched condition; and FIG. 4 is a sectional view taken along lines 4–4 of FIG. 1 illustrating the internal parts of the invention.

DESCRIPTION OF THE PREFERRED EMBODIMENT

Attention is initially invited to FIG. 1 which illustrates the preferred embodiment in association with the forward end of a trailer frame 20 having a triangularly shaped forwardly extending tow frame comprising main angle brace members 22 and 23 connected at their apex by a channel block 24 and are also connected by a transverse plate 26 and a transverse beam 28. Transverse plate 26 supports a conventional winch 30 which is shown as being hand operable by a handle 32 but which could be power driven if desired. A cable 34 is mounted on winch 30 and extends forwardly through a guide tube 36 attached to the frame. A conventional female trailer connector member 38 is mounted on the forward end of the channel block 24 in a conventional manner.

A drawbar 40 extends rearwardly from a towing vehicle of any type and supports a ball-type male trailer connector member 42 which has a downwardly extending threaded shaft 44 which extends downwardly through an aperture in the drawbar 40. Normally, the threaded shaft 44 would have a conventional retaining nut connected thereto to maintain the connector member 42 fixed to the drawbar 40. However, in the instant invention, the retaining nut is eliminated and a bearing means in the form of a hollow shaft bolt 46 is threaded over the lower end of the shaft 44 for retaining the connector 42 in place on drawbar 40.

THe exterior of the hollow shaft bolt 46 provides a cylindrical bearing surface 48 upon which a pulley 50 is mounted for rotation between spacer washers 52. Cable 34 is looped over pulley 50 and has its forward end connected to an eyebolt or other suitable member 54 on the transverse beam 28 as shown in FIG. 1.

Cable 34 is retained on pulley 50 and a safety bracket 56 connected to the lower end of shaft bolt 46 by a bolt 58 serves to shield the cable and pulley.

The manner in which the subject invention is employed will now be discussed with initial reference to FIG. 1 which illustrates the trailer and tow vehicle in separated condition. Cable 34 is looped over pulley 50 and winch 30 actuated to move the trailer forwardly toward the connector 42 in the direction of the arrow as illustrated in FIG. 2. It should be noted that the 2:1 mechanical advantage enabled by pulley 50 lessens the force that must be provided by winch 30. COnsequently, winch 30 need not be of substantially heavy design. It should be noted that the female connector is easily moved into position in engagement with the male connector 42 and that the cable can then be permitted to remain in position to provide an additional safety connection between the trailer and towing vehicle in the manner illustrated in FIG. 3.

Therefore, it will be seen that the instant invention provides a uniquely simple means which can be connected to a conventional ball-type tow connector 42 with a minimum of effort for easily enabling the connection of a trailer to the towing connector 42. Moreover, the instant invention provides an additional safety factor since cable 34 remains connected over pulley 50 if desired.

I claim:

1. In a trailer hitch coupling of the type having a male coupling member comprising a hitch ball having a downwardly extending threaded shaft on the towing vehicle over which hitch ball is received a female coupling attached to the forward end of the trailer, the improvement comprising a bearing means connected on said shaft adjacent one end of said male coupling member, rotary pulley means mounted coaxially on said bearing means with respect to said male coupling member for receiving a looped cable extending from the trailer and connected to winch means on the trailer for enabling the positioning of said female connector on said male connector by operation of said winch means.

2. THe invention of claim 1, wherein said bearing means comprises a hollow shaft bolt threadably received on the lower end of said shaft and having a smooth external surface upon which said pulley means is mounted for rotation.

3. The invention of claim 2, additionally including a safety bracket surrounding the forward portion of said pulley member and connected to said shaft bolt.

4. The invention of claim 3, wherein one end of said cable loop is connected to said winch and the other end of said cable loop is connected to the frame of the trailer.

5. The invention of claim 4, wherein said vertically extending shaft extends downwardly through a hole in a support bracket extending rearwardly from the towing vehicle.

6. The invention of claim 1, wherein said male hitch member comprises a hitch ball having a downwardly extending threaded shaft extending through a hole in a support bracket extending rearwardly from said towing vehicle.

7. The invention of claim 6, wherein said bearing means comprises a hollow shaft bolt threadably received on the lower end of said shaft and having a smooth external surface upon which said pulley means is mounted for rotation.

8. The invention of claim 7, additionally including a safety bracket surrounding the forward portion of said pulley member and connected to said shaft bolt.